(12) United States Patent
Lanner et al.

(10) Patent No.: US 6,217,921 B1
(45) Date of Patent: *Apr. 17, 2001

(54) COATED LOW-FAT AND FAT-FREE SNACK FOOD PRODUCTS AND METHOD TO PREPARE THE SAME

(75) Inventors: David Arthur Lanner; Yen-Ping Chin Hsieh, both of Cincinnati; Michael Weber, Fairfield; Pamela Susan Wehner, Harrison; Barbara Ann Anderson, Cincinnati; Maria Dolores Martinez-Serna Villagran, Mason, all of OH (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,000

(22) Filed: Jul. 20, 1999

Related U.S. Application Data
(60) Provisional application No. 60/094,056, filed on Jul. 24, 1998.

(51) Int. Cl.⁷ ............................. A21D 13/00; A23G 3/00
(52) U.S. Cl. .................. 426/103; 426/293; 426/560; 426/499; 426/448; 426/650
(58) Field of Search .................................. 426/293, 103, 426/560, 499, 448, 658

(56) References Cited

U.S. PATENT DOCUMENTS

| | | | |
|---|---|---|---|
| 4,562,079 | 12/1985 | Herzing | 426/94 |
| 4,567,047 | 1/1986 | Wilson | 426/94 |
| 4,569,847 | 2/1986 | Andrews | 426/94 |
| 4,643,900 | 2/1987 | Porter | 426/21 |
| 4,691,625 | 9/1987 | Blain et al. | 99/348 |
| 4,738,861 | 4/1988 | Blain et al. | 426/549 |
| 4,759,939 * | 7/1988 | Keller et al. | 426/549 |
| 4,803,084 | 2/1989 | Shine | 426/20 |
| 4,880,653 | 11/1989 | Keller et al. | 426/549 |
| 5,238,693 | 8/1993 | Walsh | 426/293 |
| 5,340,598 | 8/1994 | Hay, Jr. et al. | 426/496 |
| 5,514,387 * | 5/1996 | Zimmerman et al. | 426/74 |
| 5,514,404 * | 5/1996 | Zimmerman et al. | 426/549 |
| 5,536,162 | 7/1996 | Juranovic et al. | 425/462 |
| 5,658,609 | 8/1997 | Abboud et al. | 426/609 |
| 5,705,207 * | 1/1998 | Cook et al. | 426/89 |
| 5,707,448 | 1/1998 | Cordera et al. | 118/13 |
| 5,756,140 | 5/1998 | Shoop et al. | 426/302 |
| 5,876,775 | 3/1999 | Behnke et al. | 426/302 |
| 5,932,264 | 8/1999 | Hurd et al. | 426/511 |
| 5,932,268 | 8/1999 | Thomas et al. | 426/549 |
| 5,932,269 | 8/1999 | Huang et al. | 426/549 |
| 5,964,146 * | 10/1999 | Kelly et al. | 99/467 |

FOREIGN PATENT DOCUMENTS

| | | |
|---|---|---|
| 0 251 020 B2 | 1/1988 | (EP) . |
| WO 97/25880 | 7/1997 | (WO) . |
| WO 97/26296 | 7/1997 | (WO) . |
| 97/40705 | 11/1997 | (WO) . |

OTHER PUBLICATIONS

Jacobsberg, Worman, & Daniels "Lipid Binding in Wheat Flour Doughs: The Effect of DATEM Emulsifier", J. Sci. Fd Agric. 1976, 27, 1064–1070.

Baking Science & Technology; Third Edition, vol. II; E. J. Pyler, Published by Sosland Publishing Company, Copyright 1988, pp. 1064–1067.

* cited by examiner

Primary Examiner—Nina Bhat
(74) Attorney, Agent, or Firm—Melody A. Jones

(57) ABSTRACT

Disclosed are low-fat and fat-free snacks having a glossy coating and a process for making the same. Disclosed in a preferred embodiment are coated low-fat and fat-free pretzels having a surface area to inner volume ratio of from about 22 inches$^{-1}$ (8.66 cm$^{-1}$) to about 40 inches$^{-1}$ (15.75 cm$^{-1}$), a pH of about 8 or less, a digestible fat content of less than 3 g per 28 g serving, and a moisture content of from about 1% to about 4%. The large surface area to inner volume ratio permits the use of reduced concentrations of caustic solution and facilitates drying. Coated pretzels are prepared by: (1) applying a warm coating comprising a carbohydrate selected from modified starch, corn syrup solids, maltodextrins, dextrins, and mixtures thereof; water; and preferably flavoring to ready-to-eat pretzels while tumbling; (2) adding sugar and optionally salt to the tumbling pretzels; (3) removing the pretzels from the tumbling device; and (4) drying the pretzels with the products stationary. The pretzels have substantially improved texture, taste and flavor display. Additionally, the color and shiny surface which is characteristic of pretzels is maintained.

9 Claims, No Drawings

COATED LOW-FAT AND FAT-FREE SNACK FOOD PRODUCTS AND METHOD TO PREPARE THE SAME

CROSS REFERENCE TO RELATED APPLICATIONS

This application claims the benefit of U.S. provisional application No. 60/094,056 filed Jul. 24, 1998.

TECHNICAL FIELD

The present invention relates generally to low-fat and fat-free snacks having a glossy coating, a process for making the same, and the application of coatings to the snacks.

BACKGROUND OF THE INVENTION

In today's health conscious environment, there is a need for low-fat and fat-free snack products. The United States Food & Drug Administration regulations require snack products, in particular pretzels, to contain less than 3 grams digestible fat/28 gram serving size to be classified as low-fat and less than 0.5 grams digestible fat/28 gram serving size to be classified as fat-free. Therefore, substantial reformulation is necessary in order to produce snacks that will fall within the regulations and contain consumer-acceptable taste and texture qualities.

One problem to overcome in order to produce low-fat and fat-free snack products is the reduction of fat-contributing ingredients (e.g., emulsifiers, shortening, oil, flavoring, etc.) while maintaining an acceptable taste and texture. Fats play an important role in the way a dough behaves during processing and greatly affect the quality, flavor and texture of the ready-to-eat product. As the fat content in snack products is reduced or replaced with other ingredients (e.g., non-digestible fat, protein, fiber, gums), adverse organoleptical effects (e.g., mouthcoating, drying, lack of crispness and lack of flavor) are increased. The adverse organoleptic effects result in products having reduced palatability.

Another problem to overcome is the lack of flavor display and lubriciousness often exhibited by conventional low-fat and fat-free pretzels. Typically, low-fat and fat-free pretzels are hard, have decreased flavor display, and are not as lubricious as high-fat snacks such as potato chips, cheese curls, corn chips and the like.

One approach for improving the palatability, lubriciousness, and flavor display of low-fat and fat-free snacks has been to add flavors. The flavors are traditionally applied to the snack as topical coatings in the form of dry powders (with or without a binder) and/or as liquids (e.g., oil-based, water-based). Although snacks having topical coatings comprising flavors are appetizing to consumers, there are several problems associated with snack products having these topical coatings. Several problems include: (1) the products tend to be greasy and/or messy; (2) the coatings have a tendency to leave a residue on the hands of the consumers; (3) the appearance of the product can vary from batch to batch; (4) increased drying times are needed to reduce the moisture of the product; (5) the products have poor appearance (e.g., dull, powdery); and (6) the products are mouth-drying. In addition, especially in the case of pretzels, the desirable surface sheen and color is also lost.

Another approach has been to add flavor to the dough; however, these products have poor flavor display, primarily due to the interaction between the flavor and starches in the dough composition. It is believed that the starches bind the flavor components and the flavor intensity is greatly suppressed. To complicate matters further, the strong caustic-treated surface of the pretzels prevents balanced flavor display, whether additional flavors are added to the dough and/or topically to the pretzel.

Despite these various approaches which have been taken to improve consumer appeal and palatability of low-fat and fat-free pretzels, there is still an apparent need for improved low-fat and fat-free pretzels having coatings applied thereto with the visual appeal, flavor, and texture of full-fat pretzels. In addition, processes of improved efficiency, methods of producing the pretzels, and methods of coating pretzels are also needed.

An object of the present invention is to provide dough compositions suitable for making low-fat and fat-free pretzels.

Another object of the present invention is to provide coated low-fat and fat-free pretzels.

Still another object of the present invention is to incorporate flavor in a stable glossy coating which can be applied to snack foods, such as pretzels, corn chips, potato chips, puffed products, tortilla chips and the like.

A further object of the present invention is to provide a process for preparing coated pretzels having a glossy coating.

Still another object of the present invention is to provide a coating which is capable of suspending and carrying flavors for application onto the surface of snacks such as pretzels.

SUMMARY OF THE INVENTION

In accordance with the present invention, a dough composition suitable for producing low-fat and fat-free pretzels is provided. The dough composition comprises: (1) from about 55% to about 75% flour; (2) from about 0.05% to about 2% leavening; (3) from about 0% to about 4% added gluten; (4) from about 0% to about 5% corn syrup; (5) from about 25% to about 35% added water; and (6) from about 0.01% to about 7% added fat. The dough retains its shape, and additionally results in pretzels which have substantially improved taste, texture and lubriciousness when compared to conventional low-fat and fat-free pretzels.

Further, in accordance with the present invention, a process for producing coated pretzels is provided. The process comprises the steps of: (1) preparing the dough pieces; (2) applying caustic solution to the dough pieces for a time sufficient to produce ready-to eat pretzels having a pH less than about 8; (3) baking the dough pieces in an oven at a temperature of from about 200° F. (93.3° C.) to about 600° F. (315.6° C.); and (4) coating the ready-to-eat pretzels with an edible composition comprising sugar, salt, corn syrup solids, water and optionally flavoring.

Still further in accordance with the present invention, coated pretzels having a larger surface area to inner volume ratio are provided. It has been found that pretzels having a larger ratio of surface area to inner volume have substantially improved organoleptical properties (e.g., crunchiness, lubriciousness, mouthmelt, dryness) and can be produced using relatively short drying times. Levels of caustic in solutions may also be reduced which results in pretzels with less caustic taste.

In a preferred embodiment, a pretzel is prepared from a low-fat or fat-free dough. The dough pieces are conveyed through a bath of caustic solution, baked a first time at a temperature in the range of from about 375° F. (190.6° C.) to about 550° F. (287.8° C.) for about 3 to about 5 minutes and baked a second time at a temperature in the range of from about 220° F. (104.4° C.) to about 250° F. (121.1° C.) for a time sufficient to produce pretzels having a moisture content of about 1% to about 4%.

The preferred pretzels have a ratio of surface area to inner volume of about 22 inches$^{-1}$ (8.66 cm$^{-1}$) to about 40 inches$^{-1}$ (15.75 cm$^{-1}$), a pH of about 8 or less, a digestible fat content of less than 3 g/28 g serving, and a moisture content of from about 1% to about 4%.

In the production of shaped products having a small cross-sectional area, such as pretzels in the shape of a bird or other animal, the combination of gluten, diacetyl tartaric acid esters of monoglycerides (DATEM) and small amounts of shortening is preferably included in the dough composition to retain the shape of the dough during machining and baking. Also, in the production of pretzels comprising non-digestible fat, it has been found that it is important to use the combination of gluten, DATEM and shortening to: (a) improve gas retention/product expansion during baking; (b) increase the mouthmelt of the pretzel; and (c) reduce the density, hardness and dryness which may result when non-digestible fats are used in the production of snacks.

Still further in accordance with the present invention, a process for coating pretzels is provided, comprising the steps of: (1) applying a coating (comprising a carbohydrate selected from the group consisting of modified starch, corn syrup, corn syrup solids, maltodextrins, dextrins and mixtures thereof), water, and preferably, water-soluble flavoring, to ready-to-eat pretzels while tumbling; (2) adding sugar and optionally salt to the tumbling pretzels; (3) removing the pretzels from the tumbling device; and (4) drying the pretzels while in a stationary position for a time sufficient to produce pretzels having a moisture content of from about 1% to about 4%.

DETAILED DESCRIPTION OF THE INVENTION

DEFINITIONS

As used herein, the term "coating" refers to a thin film.

As used herein, the term "low-fat" means that the amount of digestible fat, as regulated by the United States Food & Drug Administration for pretzels, is 3 grams or less for a 28 gram serving. The amount of digestible fat present in a product to be labeled low-fat is referenced in terms of a reference serving size. For pretzels the reference serving size is 28 grams.

As used herein, the term "fat-free" means that the amount of digestible fat, as regulated by the United States Food & Drug Administration for pretzels, is less than 0.5 gram for a 28 gram serving. The amount of digestible fat present in a product to be labeled fat-free is referenced in terms of a reference serving size. For pretzels the reference serving size is 28 grams.

As used herein, the term "fat" is used interchangeably with the terms "shortening" and "oil" unless otherwise specified. The terms "fat", "shortening" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise; as well as edible fatty materials having properties similar to triglycerides; non-digestible fats, oils or fat substitutes; reduced calorie fats; emulsifiers; and mixtures thereof are also included in the term.

As used herein, the term "non-digestible fat" refers to those edible fatty materials that are partially or totally indigestible, e.g., polyol fatty acid polyesters, such as OLEAN™.

As used herein, "added fat" refers to fat, both digestible and non-digestible, which is added to the dough over and above that amount inherently present in the flour.

As used herein, "added gluten" refers to gluten which is added to the dough over and above that amount inherently present in the flour.

All percentages herein are by weight unless stated otherwise.

SNACK FOOD PRODUCT

The snacks of the present invention can be prepared in a variety of shapes and sizes. The invention described herein is primarily in terms of a coated pretzel, however the coating and the method for coating the pretzel can be applied to a variety of shaped snacks suitable for topical flavor applications, such as twists, balls, circles, and nuggets and the like.

Dough Composition

The dough compositions of the present invention comprise predominantly wheat flour. However, small amounts other flours, for example, barley flour, rye flour, oat flour, corn flour and mixtures thereof, may be used in combination with wheat flour. Preferably, at least about 60% of the flour is wheat flour.

Flour is present in the dough compositions at a level of from about 55% to about 75%, preferably from about 60% to about 72%, and more preferably from about 66% to about 70%.

A leavening agent is included in the dough compositions of the present invention. The preferred leavening agent is yeast. Other leavening agents, however, may be used. Examples of other leavening agents suitable for use in the present invention include sodium aluminum phosphate, alkali metal carbonates, hydrogen carbonates (e.g. sodium bicarbonate, sodium or potassium carbonate, calcium carbonate), and mixture thereof. When chemical leavening is used, it has been found that sodium bicarbonate or ammonium bicarbonate used in conjunction with the emulsifier DATEM provides improved leavening compared to the leavening provided when DATEM is not used as the emulsifier. It has also been found that dough expansion is suppressed when non-digestible fats are used in dough compositions comprising yeast. Surprisingly, DATEM helps to alleviate this problem.

The dough compositions of the present invention comprise from about 0.05% to about 2%, preferably from about 0.07% to about 1%, and more preferably from about 0.08% to about 0.5%, leavening. When yeast is used as the leavening, the level of leavening in the dough is typically in the range of from about 0.05% to about 2%, preferably from about 0.07% to about 1%, and more preferably from about 0.08% to about 0.5%.

Wheat gluten is also included in the dough compositions of the present invention to increase the strength of the dough and crunchiness of the pretzel. The dough compositions of the present invention comprise about 4% to about 11%, preferably about 5% to about 10%, and more preferably about 6% to about 8%, gluten. The dough compositions of the present invention comprise from about 0% to about 4% added gluten.

Corn syrup is typically present in the dough compositions of the present invention at a level of from about 0% to about 5%, preferably from about 0.1% to about 3%, and more preferably from about 1% to about 2%. As used herein, "corn syrup" refers to a hydrolyzed carbohydrate. Typically corn syrups are classified on the basis of dextrose equivalent (DE) value, which is a measurement of the percentage of reducing sugars in the corn syrup, calculated as dextrose, on a dry weight basis. Corn syrup typically has a DE greater than about 20. Corn syrup is available with DE values ranging from about 20 to about 65.

The dough compositions of the present invention comprise from about 0.01% to about 7%, more preferably from about 0.1% to about 4%, and most preferably about 0.2%, added fat. Suitable fats include fats such as, for example, soybean oil, corn oil, cottonseed oil, sunflower oil, palm oil, coconut oil, canola oil, fish oil, lard and tallow, which may have been partially or completely hydrogenated or modified otherwise, as well as non-digestible fats, reduced calorie fats; fat substitutes; emulsifiers; and mixtures thereof.

The term "non-digestible fat" refers to those edible fatty materials that are partially or totally indigestible, e.g., polyol fatty acid polyesters, such as OLEAN®. Particularly preferred are non-digestible fats such as those described in U.S. Pat. No. 3,600,186 to Mattson et al., issued May 12, 1970; U.S. Pat. No. 4,005,195 to Jandacek, issued Jan. 25, 1977; U.S. Pat. No. 4,005,196 to Jandacek et al., issued Jan. 25, 1977; U.S. Pat. No. 4,034,083 to Mattson, issued Jul. 5, 1977; and 4,241,054 to Volpenhein et al., issued Dec. 23, 1980, all of which are incorporated by reference.

As used herein, the term "polyol" is intended to include any aliphatic or aromatic compound containing at least 2 free hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars are mannose, galactose, arabinose, xylose, ribose, apiose, rharnnose, psicose, fructose, sorbose, tagatose, ribulose, xylulose, and erthrulose. Oligosaccharides suitable for use herein include, for example, maltose, kojibiose, nigerose, cellobiose, lactose, melibiose, gentiobiose, turanose, rutinose, trehalose, sucrose and raffmose. Polysaccharides suitable for use herein include, for example, amylose, glycogen, cellulose, chitin, inulin, agarose, zylans, mannan and galactans. Although sugar alcohols are not carbohydrates in a strict sense, the naturally occurring sugar alcohols are so closely related to the carbohydrates that they are also preferred for use herein. Natural sugar alcohols which are suitable for use herein are sorbitol, mannitol, and galactitol. Particularly preferred classes of materials suitable for use herein include the monosaccharides, the disaccharides and sugar alcohols. Preferred unesterified polyols include glucose, fructose, glycerol, alkoxylated polyglycerols, sugar ethers, and linked alkoxylated glycerines as described in U.S. Pat. No. 5,516,544 to Sekula et al., issued Jun. 14, 1996, incorporated by reference. A particularly preferred polyol is sucrose. Preferred alkoxylated polyols are described in the following U.S. Patents, incorporated by reference herein; U.S. Pat. No. 5,273,772 to Cooper, issued Dec. 28, 1993; U.S. Pat. No. 5,288,884 to Cooper, issued Feb. 22, 1994; U.S. Pat. No. 5,298,637 to Cooper, issued Mar. 29, 1994; U.S. Pat. No. 5,362,894 to Handwerker et al., issued Nov. 8, 1994; U.S. Pat. No. 5,374,446 to Ferenz et al., issued Dec. 20, 1994; U.S. Pat. No. 5,387,429 to Cooper, issued Feb. 7, 1995; U.S. Pat. No. 5,427,815 to Ferenz, issued Jun. 27, 1995; U.S. Pat. No. 5,466,843 to Cooper, issued Nov. 14, 1995; U.S. Pat. No. 5,516,544; U.S. Pat. No. 5,589,217 to Mazurek, issued Dec. 31, 1996; and U.S. Pat. No. 5,597,605 to Mazurek, issued Jan. 28, 1997. More preferred alkoxylated glycerines are linked alkoxylated glycerines and are described in the following patents, previously incorporated herein, U.S. Pat. Nos. 5,374,446; 5,427,815; and 5,516,544. Especially preferred alkoxylated glycerines are those described in U.S. Pat. No. 5,516,544, previously incorporated by reference.

By "polyol fatty acid polyester" is meant a polyol having at least 2 fatty acid ester groups. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, (e.g., cis- or trans-isomers) and can be the same for all ester groups, or can be mixtures of different fatty acids.

Liquid non-digestible oils can also be used in the present invention. Liquid non-digestible oils which have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterified alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterified polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred.

The preferred non-digestible fats are fatty materials having properties similar to triglycerides such as sucrose polyesters. OLEAN®, a preferred non-digestible fat, is made by The Procter and Gamble Company. These preferred non-digestible fats are described in Young et al., U.S. Pat. No. 5,085,884, issued Feb. 4, 1992, and U.S. Pat. No. 5,422,131, issued Jun. 6, 1995 to Elsen et al.

An emulsifier is also preferably added to the dough composition of the present invention. The emulsifier may be selected from the group consisting of polyglycerol monoesters, mono and diglycerides, diacetyl tartaric acid esters of monoglycerides (DATEM), mono-di-glycerides, lecithin, and mixtures thereof. Preferably the emulsifier comprises DATEM and shortening at a ratio of DATEM-:shortening of from about 10:1 to about 1:10, preferably from about 3:1 to about 1:2, and more preferably at a ratio of about 2:1. The ratio of DATEM:shortening can vary depending on whether the product is designed to be a low-fat product or a fat-free product. The blend of DATEM and shortening is typically used as an emulsifier system in the dough at a level of from about 0.05% to about 1%, and preferably at a level of from about 0.2% to about 0.4%.

It is believed that the emulsifier aids in extrusion by functioning as a lubricant and thus allowing increased extrusion rates. It is additionally believed that the emulsifier works in combination with the gluten by increasing and stabilizing gas entrapment. It has been found that products comprising DATEM and gluten exhibit substantially improved texture (e.g., increase mouthmelt, long lasting crunchiness).

Water is also added to the dough compositions of the present invention. Preferably, the dough compositions comprise from about 25% to about 35% added water, more preferably from about 27% to about 30%, and most preferably from about 28.5% to about 29.5%. The term "added water" refers to water which has been added to the dry ingredients. Water which is inherently present in the dry dough ingredients is not included in the term "added water." Water present in the corn syrup is not included in the term "added water."

Optionally, malt may be added to supplement and/or alter flavor and texture of the final product. However, the addition of high levels of malt may affect the rheology of the dough and cause the loss of definition upon extrusion and cutting. Malt, if used, is preferably present in the doughs of the present invention at a level of less than about 1.5%.

Flavors may also be added to the dough compositions. Preferred flavors include sourdough, mustard, honey, garlic, and onion. Flavors are typically added to the dough at a level of less than about 10%, preferably in the range of from about 0.5% to about 2%. The amount of flavor added will depend upon the concentration of the flavor, type of flavor added, and the taste desired.

Process for Making Pretzels

Conventional mixing apparatus may be used to prepare the pretzels of the present invention. Preferably flour, yeast, shortening, emulsifier, corn syrup, wheat gluten, water, and flavors, if desired, are mixed in a conventional mixer and added to an extruder. The pretzels may be extruded using conventional pretzel extruders. Extruders suitable for use in this invention preferably have non-intermeshing screws, and are specifically designed to operate at a pressure lower than 120 psi, and at lower work input (i.e., without overworking the dough). A suitable extruder is a single unit extruder available from Reading Pretzel Machinery Corporation, Robesonia, Pa. A preferred extruder is an extruder which has a die that shapes the dough to the desired shape upon exiting the extruder. However, dough pieces may be formed by any suitable means such as extrusion, stamping, rolling, cutting or molding. For pretzels described herein as exemplary of the present invention, extrusion through a die onto a conveyer is preferred because it permits the rapid and continuous forming of dough pieces while allowing good control over the shape, form and surface characteristics of the pretzel.

After extrusion, the dough pieces are allowed to sit stationary on a moving conveyor to "proof." This "proofing" allows the dough piece to increase in volume while the fermentation reaction between the yeast and other dough ingredients generate ethanol gas and carbon dioxide gas. Typically, the proofing time is about equal to the baking time in the first baking stage.

After proofmg, the dough pieces are treated with a caustic solution having a temperature of from about 70° F. (21.1° C.) to about 210° F. (98.9° C.), preferably from about 170° F. (76.7° C.) to about 205° F. (96.1° C.), and more preferably from about 190° F. (87.8° C.) to about 200° F. (93.3° C.). The caustic solution may be applied to the pretzels by various methods. Preferably the caustic solution is applied to the pretzels by dipping the pretzels in a caustic solution typically comprising from about 0.1% to about 4%, preferably from about 0.5% to about 1.5%, and most preferably from about 0.6% to about 0.8% sodium hydroxide for less than about 20 seconds, preferably for about 7 seconds to about 10 seconds. The concentration of caustic solution used is dependent on several factors, including: (a) piece size; (b) contact time of the solution with the pretzel; and (c) procedure used to treat the pretzel (e.g., waterfall, spray, dip). It has been found that for preferred embodiments (i.e., pretzels of the present invention having a high ratio of surface area to inner volume), caustic concentrations (~1%–2%) used in conventional pretzel processing resulted in products having a strong caustic taste and very hard texture. One advantage of the process of the present invention is the ability to use lower levels of caustic solution which results in products having substantially reduced caustic-flavor. The pretzels additionally have surfaces which readily accept topical flavors and which have improved flavor display.

Alternatively, the dough pieces may be conveyed through a waterfall or an atomized spray zone of hot caustic solution having a plurality of nozzles for uniformly coating the outer surface of the dough pieces. The atomized spray should be sufficient to provide enough thermal heat to set proteins, gelatinize surface starches and activate leavening. If a waterfall is used, a caustic solution comprising from about 2% to about 7%, preferably from about 3% to about 6% and more preferably from about 4% to about 5%, sodium hydroxide is typically used.

Following the caustic treatment, the dough pieces are optionally salted and finally conveyed to an oven where they are baked at a temperature of from about 200° F. (93.3° C.) to about 600° F. (315.6° C.), and preferably from about 230° F. (110° C.) to about 450° F. (232.2° C.). Most preferably, the dough pieces are baked using a two-step process wherein first the dough pieces are carried through a high temperature oven having a temperature of from about 375° F. (190.6° C.) to about 550° F. (287.8° C.) for about 3 to about 5 minutes, and next they are conveyed through a lower temperature oven having a temperature of from about 190° F. (87.8° C.) to about 300° F. (148.9° C.), preferably from about 220° F. (104.4° C.) to about 250° F. (121.1° C.), for a time sufficient to obtain a finished pretzel having a moisture content of less than about 4%.

Pretzel

The resulting pretzels have a pH of from about 6 to about 8, preferably from about 6.3 to about 7.5 and more preferably from about 6.5 to about 7.2; in comparison, conventional pretzels typically have a pH greater than about 8. The pretzel also has less than 3 g digestible fat per 28 gram serving, and has a ratio of surface area to inner volume of from about 22 inches$^{-1}$ (8.66 cm$^{-1}$) to about 40 inches$^{-1}$ (15.75 cm$^{-1}$) preferably from about 25 inches$^{-1}$ (9.84 cm$^{-1}$) to about 33 inches$^{-1}$ (12.99 cm$^{-1}$) and more preferably from about 27 inches$^{-1}$ (10.63 cm$^{-1}$) to about 29 inches$^{-1}$ (11.42 cm$^{-1}$), calculated using the following formula:

$$\frac{\text{Surface}}{\text{Inner Volume}} = \frac{2\pi r h}{\pi r^2 h} = \frac{2}{r}$$

wherein r is the radius of the pretzel piece and h is the total rope length of a pretzel piece if all intersections are cut and the segments are joined end-to-end.

Coating Composition

The coating composition comprises: (a) a carbohydrate selected from the group consisting of corn syrup, corn syrup solids, modified starch and mixtures thereof; (b) water; and (c) optionally flavoring and salt.

Preferably the coating comprises from about 47% to about 59% water and has a total solids content of from about 41% to about 53%. As used herein, the term "water" refers to the total amount of water. This includes water which is inherently present in the dry and liquid ingredients added to the coating such as in the case of the sources of modified starch, sugar, starches, dextrins, maltodextrins, and corn syrup solids Carbohydrates are added to the coating composition. Preferably the carbohydrate is present in the coating at a level of from about 11% to about 15%. Carbohydrates suitable for use in the present invention are selected from the group consisting of corn syrup, corn syrup solids, modified starch, maltodextrins, dextrins and mixtures thereof. Suitable carbohydrates produce a glossy coating when applied to the surface of the product and the product is processed as described herein. Preferably, water evaporates relatively quickly from the coating containing the carbohydrate, the carbohydrate is capable of forming a thin film, and the carbohydrate imparts no adverse taste to the product.

"Corn syrup" and "corn syrup solids" refer to hydrolyzed carbohydrates. Corn syrup solids suitable for use herein have a DE in the range of from about 20 to about 44. Corn syrups suitable for used herein have a DE in the range of from about 20 to about 65.

Modified starches suitable for use herein include any suitable food which has been modified by at least partial hydrolysis and/or chemical modifications. Suitable modified starches can be derived from starches such as corn, potato, tapioca, and rice by processes including gelatinization, acetylation, chlorination, acid hydrolysis, enzymatic action, oxidation, or the introduction of carboxyl, sulfate or sulfonate groups.

The sugars suitable for used herein may be selected from sugars such as sucrose, dextrose, and fructose. Preferably, sucrose is used because it is non-reducing and has a reduced tendency to form non-enzymatic browning products and thus imparts less browning to the finished products. Sugar is typically used at a level of from about 14% to about 24%.

Optionally, and preferably, other ingredients such as salt, flavoring and coloring may be added to the coating composition of the present invention. Examples of flavorings include seasoning, condiments, herbs, spices, vegetables, fruit, dairy components/flavors (e.g., yogurt, cheese), sweetening components/flavors (e.g., honey, caramel, vanilla, chocolate), malt and mixtures thereof The flavors may be added to the coating as a liquid or may be added in a coarse, medium or fmely granulated form. Fat or oil-based flavorings may also be added but will increase the overall fat content of the fmal product. Additionally, fat or oil based flavoring may reduce the tendency of the coating to adhere to the base pretzel. Particularly preferred flavorings include yogurt, honey-mustard, sour cream and onion, bacon, caramel, toffee, malt, and sourdough. If fat or fat-based flavors are added to the coating, the level of fat present in the coating is preferably less than about 5%. Flavorings can be added to the coating composition up to a level of about 75%. Preferably flavors are added at a level of from about 17% to about 56%.

Salt is typically added to the coating compositions at a level of from about 0% to about 2.5%, preferably from about 0.5% to about 1.4%.

Vitamins and minerals may also be added to the coating compositions of the present invention.

The coatings of the present invention can be applied to snack products such as corn chips, potato chips, puffed products, tortilla chips and preferably pretzels using a process comprising the steps of: (1) applying a warm coating comprising a carbohydrate, water, and preferably flavoring, to ready-to-eat snack products while tumbling; (2) adding sugar and optionally salt to the tumbling snack products; (3) removing the snack products from the tumbling device; and (4) drying the snack products while in a stationary position.

The snack products are in a ready-to-eat form and are at a temperature of from about 60° F. (15.6° C.) to about 150° F. (65.6° C.), preferably from about 70° F. (21.1° C.) to abou when the coating is applied. The coating material should be fluid enough to properly coat the snack products. This typically requires a coating having a temperature of from about 40° F. (4.4° C.) to about 200° F. (93.3° C.), preferably from about 70° F. (21.1° C.) to about 180° F. more preferably from about 110° F. (43.3° C.) to about 170° F. (76.7° C.). The pretzels are placed into a coating apparatus. A hot solution comprising water, carbohydrate and any liquid ingredients is applied to the snack product. The solution may be applied by any conventional means which coats the products, for example, spray, waterfall, brushing, pouring or dipping. The pretzels are coated with the solution in a revolving coating pan or drum. Preferably, the coating is applied to the snack products by spray nozzles located in a tumbling drum. It is preferred that the snack products tumble during coating to ensure proper coating. Preferably, the snack products comprise less than about 25% coating, more preferably from about 5% to about 20%, and most preferably from about 10% to about 15% coating. A coating level greater than about 25% is less desirable because it increases the drying time.

After the snack products are coated with a sufficient amount of the solution, the solids are added to the tumbling snack products. After the coating is deposited onto the snack products, the snack products are transferred to an oven and dried at a temperature of from about 220° F. (104.4° C.) to about 300° F. (148.9° C.), preferably from about 230° F. (110.0° C.) to about 280° F. (137.8° C.), and more preferably from about 250° F. (121.1° C.) to about 275° F. (135.0° C.), for a time sufficient to produce a snack product having a moisture content of from about 1% to about 4%, preferably from about 1.5% to about 3.5%, more preferably from about 2.0% to about 2.7%. Preferably, the coated snack products are conveyed to an oven such as a conventional band oven or forced air oven.

The coating compositions, when applied to snack products and in particular low-fat and fat-free pretzels, form coated low-fat and fat-free snacks which are both attractive and palatable to consumers. A glossy coating which improves the appearance, texture, flavor, and mouthmelt is very desirable in such products.

EXAMPLES

The following examples are illustrative of the invention but are not meant to be limiting thereof.

Example 1

A fat-free pretzel is prepared from the following dough composition:

| Ingredient | Wt % |
| --- | --- |
| Flour | 68.00 |
| Water | 28.45 |
| Corn Syrup | 2.00 |
| Wheat Gluten | 1.00 |
| Shortening | 0.15 |
| Emulsifier | 0.30 |
| Yeast | 0.10 |
| Total | 100.00 |

All of the ingredients are combined in a dough mixer. The ingredients are mixed until well blended. The dough is fed into a single unit extruder equipped with a bandcutter, such as that sold by Reading Pretzel Machinery Corporation. The dough extrudate is conveyed on a moving screen and through 0.6% hot sodium hydroxide solution having a temperature of about 190° F. (87.8° C.). After being dipped, the partially-cooked pretzels are cooked in an oven having a temperature of about 425° F. (218.3° C.) for about 5 minutes and then placed in a kiln having a temperature of about 220° F. (104.4° C.) for a time sufficient to reduce the moisture to about 2.5%.

Example 2

A pretzel comprising non-digestible fat is prepared from the following dough composition:

| Ingredient | Wt % |
| --- | --- |
| Flour | 65.90 |
| Water | 29.00 |
| Corn Syrup | 1.60 |
| Wheat Gluten | 1.50 |
| Olean ® | 1.50 |
| Emulsifier | 0.40 |
| Yeast | 0.10 |
| Total | 100.00 |

Olean® is a non-digestible fat available from The Procter and Gamble Company, Cincinnati, Ohio.

All of the ingredients are combined in a dough mixer. The ingredients are mixed until well blended. The dough is fed into a single unit extruder equipped with a bandcutter, such as that sold by Reading Pretzel Machinery Corporation. The dough extrudate is conveyed on a moving screen and through 0.8% hot sodium hydroxide solution having a temperature of about 200° F. (93.3° C.). After being dipped, the partially-cooked pretzels are cooked in an oven having a temperature of about 450° F. (232.2° C.) for about 4 minutes and then placed in a kiln having a temperature of about 250° F. (121.1° C.) for a time sufficient to reduce the moisture to about 2.5%.

Example 3

A flavored pretzel is prepared from the following dough composition according to the method of Example 1:

| Ingredient | Wt % |
| --- | --- |
| Flour | 65.00 |
| Water | 30.00 |
| Corn Syrup solids | 2.55 |
| Wheat Gluten | 1.00 |
| Shortening | 0.15 |
| Emulsifier | 0.30 |
| Yeast | 0.10 |
| Onion powder | 0.60 |
| Garlic Powder | 0.30 |
| Total | 100.00 |

Example 4

A honey flavored coating composition is prepared from the following:

| Ingredient | Wt % |
| --- | --- |
| Water | 53.00 |
| Corn Syrup solids | 12.50 |
| Sucrose | 25.00 |
| Natural and artificial flavoring | 8.00 |
| Salt | 1.40 |
| Honey Powder | 0.10 |
| Total | 100.00 |

The coating is prepared by combining all ingredients in a larger mixer and blending on low speed until all ingredients are mixed and no there are no lumps. The solution is heated to about 160° F. (71.1° C.) to facilitate dissolution. The coating is applied to the base pretzel of Example 1. The base pretzels are continuously fed into a rotating drum lined with flights. The liquid coating is added in as a continuous stream at the beginning of the drum in order to coat the pretzels as the drum rotates. The solid flavors are added in a continuous curtain to the tumbling product stream at the end of the drum, prior to the discharge of the product. Upon discharge from the tumble drum, the product is conveyed in such a fashion as to spread the pretzels into a tightly-packed, mono-layer arrangement; this prevents the product from forming large agglomerates during the subsequent drying process. The coated product is then conveyed to a convection oven and dried at about 275° F. (135.0° C.) until the product reaches a moisture content of about 2.5%.

What is claimed is:

1. A dough composition for producing low-fat and fat-free snacks comprising:
   (a) from about 55% to about 75% flour;
   (b) from about 0.05% to about 2% leavening;
   (c) added gluten, at a level of up to about 4%;
   (d) from about 0% to about 5% corn syrup;
   (e) from about 25% to about 35% added water;
   (f) from about 0.01% to about 7% added fat; and
   (g) an emulsifier system comprising DATEM and shortening at a ratio of DATEM:shortening of from about 10:1 to about 1:10.

2. The dough composition of claim 1 comprising from about 1% to about 2% corn syrup and from about 0.05% to about 1% of said emulsifier system.

3. The dough composition of claim 2 comprising from about 0.2% to about 0.4% of said emulsifier system, wherein said emulsifier system has a ratio of DATEM:shortening of from about 3:1 to about 1:2.

4. A pretzel prepared from a dough composition comprising:
   (a) from about 55% to about 75% flour;
   (b) from about 0.05% to about 2% leavening;
   (c) added gluten, at a level of up to about 4%;
   (d) from about 0% to about 5% corn syrup;
   (e) from about 25% to about 35% added water;
   (f) from about 0.01% to about 7% added fat; and
   (g) an emulsifier system comprising DATEM and shortening at a ratio of DATEM:shortening of from about 10:1 to about 1:10;
   wherein said pretzel has less than 3 grams of digestible fat/28 gram serving, a pH of about 8 or less, and from about 1% to about 4% moisture.

5. The pretzel of claim 4 wherein said pretzel has a surface area to inner volume ratio of from about 22 inches$^{-1}$ (8.66 cm$^{-1}$) to about 40 inches$^{-1}$ (15.75 cm$^{-1}$).

6. The pretzel of claim 5 wherein said pretzel has a pH of from about 6 to about 7.5, a surface area to volume ratio of from about 27 inches$^{-1}$ (10.63 cm$^{-1}$) to about 29 inches$^{-1}$ (11.42 cm$^{-1}$), and from about 2% to about 2.7% moisture.

7. The pretzel of claim 6 wherein said pretzel is in the shape of an eagle.

8. The pretzel of claim 6 further comprising a coating.

9. The pretzel of claim 8 wherein said coating comprises a flavor selected from the group consisting of yogurt, honey-mustard, sour cream and onion, bacon, caramel, toffee and malt.

* * * * *